(12) United States Patent
Brooksby et al.

(10) Patent No.: US 8,610,755 B2
(45) Date of Patent: Dec. 17, 2013

(54) METHODS AND APPARATUSES FOR MULTI-LINGUAL SUPPORT FOR HEARING IMPAIRED COMMUNICATION

(75) Inventors: Scot Lorin Brooksby, Highland, UT (US); Ron Callis Morrill, Lehi, UT (US); Jesse Leigh Parent, Cottonwood Heights, UT (US); Steven Duane Thurber, Farmington, UT (US); Merle Lamar Walker, III, West Jordan, UT (US)

(73) Assignee: Sorenson Communications, Inc., Salt Lake City, UT (US)

( * ) Notice: Subject to any disclaimer, the term of this patent is extended or adjusted under 35 U.S.C. 154(b) by 394 days.

(21) Appl. No.: 13/030,823

(22) Filed: Feb. 18, 2011

(65) Prior Publication Data
US 2012/0212567 A1 Aug. 23, 2012

(51) Int. Cl.
*H04N 7/14* (2006.01)
*H04M 11/00* (2006.01)

(52) U.S. Cl.
USPC ............ 348/14.01; 348/14.08; 348/14.12; 379/52; 379/207.02; 455/404.2; 455/517; 701/431; 704/3; 704/260; 704/271; 706/47; 709/230

(58) Field of Classification Search
USPC .............. 348/14.01, 14.08, 14.12; 379/52, 379/207.02; 455/404.2, 517; 704/260, 271, 704/3; 701/431; 706/47; 709/230
See application file for complete search history.

(56) References Cited

U.S. PATENT DOCUMENTS

| | | | |
|---|---|---|---|
| 4,365,238 A | 12/1982 | Kollin | |
| 4,379,210 A | 4/1983 | Sparber | |
| 4,578,542 A | 3/1986 | Alderman | |
| 4,608,457 A | 8/1986 | Fowler et al. | |
| 4,707,855 A | 11/1987 | Pasinski et al. | |
| 4,926,459 A | 5/1990 | Advani et al. | |
| 4,951,311 A | 8/1990 | Sterr | |
| 4,953,205 A | 8/1990 | Yang | |
| 5,280,523 A | 1/1994 | Lee | |
| 5,450,470 A * | 9/1995 | Alheim | 379/52 |
| 5,475,733 A * | 12/1995 | Eisdorfer et al. | 379/52 |
| 5,570,421 A | 10/1996 | Morishima | |
| 5,576,690 A | 11/1996 | Waugh et al. | |
| 5,686,881 A | 11/1997 | Ridout | |
| 5,724,405 A * | 3/1998 | Engelke et al. | 379/52 |
| 5,745,550 A * | 4/1998 | Eisdorfer et al. | 379/52 |
| 5,815,196 A * | 9/1998 | Alshawi | 348/14.12 |
| 5,877,676 A | 3/1999 | Shankarappa | |

(Continued)

*Primary Examiner* — Gerald Gauthier
(74) *Attorney, Agent, or Firm* — TraskBritt

(57) ABSTRACT

Methods and apparatuses for automated multi-lingual support are described herein. A relay service provides translation services between a hearing-impaired user and a hearing-capable user. The relay service includes a database with one or more entries. Each of the one or more entries is associated with a contact of the hearing-impaired user and includes one or more connection indicators for the contact and one or more spoken languages for the contact. A profile system determines an identified entry in the database using a calling connection indicator associated with the hearing-capable user to compare with the one or more connection indicators. A call distribution system establishes a calling connection over a voice-capable network with the calling connection indicator associated with the hearing-capable user and routes the calling connection to a translator capable in the one or more spoken languages associated with the hearing-capable user determined from the identified entry.

21 Claims, 4 Drawing Sheets

(56) References Cited

U.S. PATENT DOCUMENTS

| | | | | |
|---|---|---|---|---|
| 5,991,723 | A * | 11/1999 | Duffin | 704/260 |
| 6,229,430 | B1 | 5/2001 | Smith Dewey | |
| 6,549,611 | B2 * | 4/2003 | Engelke et al. | 379/52 |
| 6,574,323 | B1 * | 6/2003 | Manuel et al. | 379/207.02 |
| 6,693,663 | B1 * | 2/2004 | Harris | 348/14.08 |
| 6,714,637 | B1 | 3/2004 | Kredo | |
| 6,934,366 | B2 * | 8/2005 | Engelke et al. | 379/52 |
| 7,016,479 | B2 | 3/2006 | Flathers et al. | |
| 7,075,564 | B1 | 7/2006 | Jewell et al. | |
| 7,079,628 | B1 * | 7/2006 | Burritt et al. | 379/52 |
| 7,142,643 | B2 | 11/2006 | Brooksby | |
| 7,206,386 | B2 | 4/2007 | Clapp et al. | |
| 7,515,900 | B2 * | 4/2009 | Van Camp | 455/404.2 |
| 7,555,104 | B2 * | 6/2009 | Engelke | 379/52 |
| 7,573,985 | B2 * | 8/2009 | McClelland et al. | 379/52 |
| 7,583,286 | B2 | 9/2009 | Brooksby et al. | |
| 7,609,286 | B2 | 10/2009 | Cupal et al. | |
| 7,620,158 | B2 * | 11/2009 | Park et al. | 379/52 |
| 7,742,068 | B2 | 6/2010 | Cupal et al. | |
| 7,746,984 | B2 | 6/2010 | Nola et al. | |
| 7,746,985 | B2 | 6/2010 | Armstrong et al. | |
| 7,769,141 | B2 | 8/2010 | Cupal et al. | |
| 7,978,827 | B1 * | 7/2011 | Becker et al. | 379/52 |
| 8,325,883 | B2 * | 12/2012 | Schultz et al. | 379/52 |
| 8,400,491 | B1 * | 3/2013 | Panpaliya et al. | 348/14.12 |
| 8,473,443 | B2 * | 6/2013 | Lewis et al. | 706/47 |
| 2002/0194011 | A1 * | 12/2002 | Boies et al. | 705/1 |
| 2003/0017836 | A1 * | 1/2003 | Vishwanathan et al. | 455/517 |
| 2003/0069899 | A1 * | 4/2003 | Brown et al. | 707/200 |
| 2007/0043503 | A1 * | 2/2007 | Oesterling et al. | 701/211 |
| 2009/0106016 | A1 * | 4/2009 | Athsani et al. | 704/3 |
| 2009/0138270 | A1 * | 5/2009 | Fletcher et al. | 704/271 |
| 2012/0212567 | A1 * | 8/2012 | Brooksby et al. | 348/14.01 |

\* cited by examiner

METHODS AND APPARATUSES FOR MULTI-LINGUAL SUPPORT FOR HEARING IMPAIRED COMMUNICATION

TECHNICAL FIELD

The invention discussed herein relates generally to video phone communication systems, and more specifically, to methods and apparatuses for automatically configuring communication session between a hearing-impaired person and hearing capable persons using different spoken languages.

BACKGROUND

Many individuals with significant hearing loss are not able to communicate effectively over conventional telephone systems that rely upon voice communications. Since the early 1960s, devices have been available for facilitating the communication between hearing and hearing-impaired users.

The hearing-impaired user would utilize a teletypewriter (TTY) to communicate over the telephone lines. Such devices, known as Telephone Devices for the Deaf (TDDs) are configured to allow a hearing-impaired user to type a message on a keyboard that is then sent to the receiving user. Upon receipt of the coded signal, the signal is decoded and displayed on a message terminal. The receiving party may thereafter respond using a similar procedure. It should be apparent that such a communication approach is slow and cumbersome. Standardized methodologies have been developed for enabling a hearing-impaired user equipped with a TDD to communicate telephonically with normal hearing individuals not equipped with an equivalent device. To provide such a capability, relay services have been established and staffed with interpreters equipped to receive phone calls from either the hearing-impaired user as initiated using a TDD or from a hearing-capable user using conventional voice telephony. The relay interpreter's function is to establish a communication session between the calling and called parties and to thereafter serve as an interpreter between the users. In a typical conversation utilizing the relay services, the hearing-impaired user enters keystrokes, which in turn send a message to the relay services interpreter who then voices the received text-based message to the hearing party over a voice-based communication channel. A hearing-capable user thereupon may voice a response to the relay services interpreter who in turn enters keystrokes that form a text-based message, which is delivered to the hearing-impaired user and presented on the TDD device. Such a process continues for the duration of the conversation or communication session.

While TDD devices facilitate communication with at least one hearing-impaired user, they are limited in fulfilling various needs of hearing-impaired users and more particularly in providing communication options for hearing-impaired individuals having varying degrees of impairment. For example, a hearing-impaired individual, while being impaired as to the hearing or receiving of audio signals, may in fact be capable of generating voice communication that is adequately intelligible so as to be comprehended by a hearing-capable party. In fact a significant number of hearing-impaired individuals have the ability to intelligibly speak but their hearing is inadequate for conventional communications over voice telephony. For efficiency, as well as other reasons, such speech-capable hearing-impaired individuals regularly desire to converse using voice-based responses.

Video phone communication systems provide visual and audio communication between two or more users during a communication session. A video phone camera at a first location can transmit and receive audio and video signals to and from a video phone camera at a second location such that participants at the first location are perceived to be present or face-to-face with participants at a second location and vice versa.

Video phone communication systems span a variety of applications. One possible application of a video phone system includes facilitization of a communication session with a deaf or hearing-impaired user. A hearing-impaired user can use a video phone during a communication session to relay his or her expressions. The expressions, such as sign language and/or body language, may be interpreted or translated by a translation service such as a video relay service (VRS). The translation service provides a hearing-capable translator who relays the expressions of the hearing-impaired caller to a hearing-capable user on the other end of the communication session in a conventional manner, such as through the use of a voice-based dialogue conveyed over a conventional voice phone.

A hearing-impaired user may have a need to communicate with a hearing-capable user that speaks a language different from the standard language spoken by translators at the VRS. In such cases, conventional VRS systems have a translator answer a call from a hearing-capable user in the standard language. If the translator does not handle calls in the spoken language of the hearing-capable user, the translator must then reroute the call to another translator that can handle the spoken language of the hearing-capable user.

Therefore, in order to provide increased efficiency for users of a VRS, there is a need for improving efficiencies during the setup time of a call from hearing-capable users using different spoken languages.

BRIEF SUMMARY

Embodiments discussed herein are directed toward methods and apparatuses for Video Relay Systems (VRS) that automatically support and route calls for multiple spoken languages with hearing-capable users.

One embodiment of the invention includes a relay service for providing translation services between a hearing-impaired user and a hearing-capable user. The relay service includes a database with one or more entries. Each of the one or more entries is associated with a contact of the hearing-impaired user and includes one or more connection indicators for the contact and one or more spoken languages for the contact. A profile system is configured to determine an identified entry in the database using a calling connection indicator associated with the hearing-capable user to compare with the one or more connection indicators. A call distribution system is configured to establish a calling connection over a voice-capable network with the calling connection indicator associated with the hearing-capable user and route the calling connection to a translator capable in the one or more spoken languages associated with the hearing-capable user determined from the identified entry.

Another embodiment of the invention includes an apparatus for enabling a relay service between a hearing-capable user and a hearing-impaired user. The apparatus includes a database configured to store therein one or more entries. Each of the one or more entries is associated with a contact of the hearing-impaired user and includes one or more connection indicators for the contact and one or more spoken languages for the contact. Processing hardware is configured to perform a call-receiving process to establish a calling connection with the hearing-capable user over a voice-capable network using a calling connection indicator. The processing hardware is also configured to perform a routing process to determine an identified entry of the one or more entries correlated to the calling connection indicator and route the calling connection to a translator capable in the one or more spoken languages. A call-placing process to be performed by the processing hardware is configured to establish a video-capable connection between the hearing-impaired user and the translator over a video-capable network.

Another embodiment of the invention includes a method for enabling electronic communication with a hearing-capable user and a hearing-impaired user. The method includes selecting an identified entry from a database comprising one or more entries, wherein each of the one or more entries is associated with a contact of the hearing-impaired user and includes one or more connection indicators for the contact and one or more spoken languages for the contact. The identified entry is selected responsive to the one or more connection indicators for the hearing-capable user. The method also includes routing a calling connection from the hearing-capable user to a translator capable in the one or more spoken languages of the hearing-capable user.

In yet another embodiment of the invention, computer-readable media includes instructions configured to cause processing hardware to select an identified entry from a database comprising one or more entries, wherein each of the one or more entries is associated with a contact of a hearing-impaired user and includes one or more connection indicators for the contact and one or more spoken languages for the contact. The identified entry is selected responsive to the one or more connection indicators for a hearing-capable user. The instructions are also configured to cause processing hardware to route a calling connection from the hearing-capable user to a translator capable in the one or more spoken languages of the hearing-capable user.

DETAILED DESCRIPTION

Figure 1:
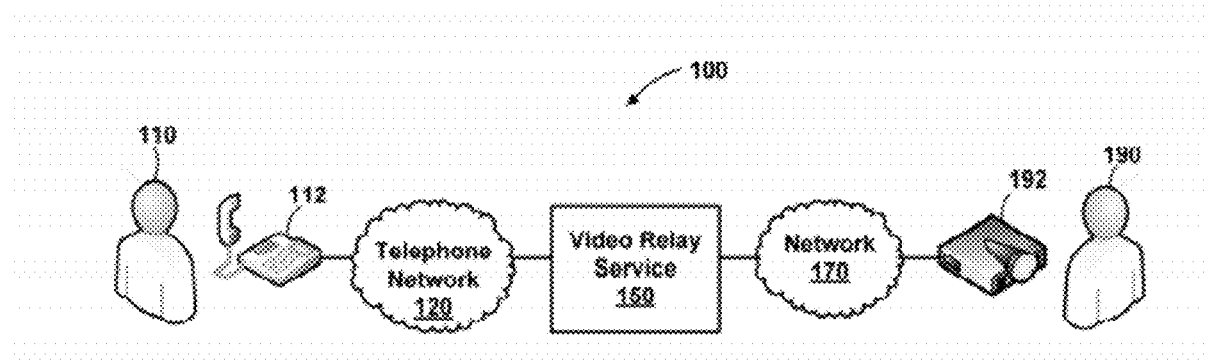
FIG. 1 is a simplified block diagram of a conventional hearing-impaired communication system.

In the following detailed description, reference is made to the accompanying drawings that form a part hereof, and in which is shown by way of illustration specific embodiments in which the invention may be practiced. These embodiments are described in sufficient detail to enable those of ordinary skill in the art to practice the invention. It should be understood, however, that the detailed description and the specific examples, while indicating examples of embodiments of the invention, are given by way of illustration only and not by way of limitation. From this disclosure, various substitutions, modifications, additions rearrangements, or combinations thereof within the scope of the present invention may be made and will become apparent to those of ordinary skill in the art.

In accordance with common practice the various features illustrated in the drawings may not be drawn to scale. The illustrations presented herein are not meant to be actual views of any particular method, device, or system, but are merely idealized representations that are employed to describe various embodiments of the present invention. Accordingly, the dimensions of the various features may be arbitrarily expanded or reduced for clarity. In addition, some of the drawings may be simplified for clarity. Thus, the drawings may not depict all of the components of a given apparatus (e.g., device) or method. In addition, like reference numerals may be used to denote like features throughout the specification and figures.

Those of ordinary skill in the art would understand that information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

Those of ordinary skill would further appreciate that the various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the invention described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Embodiments discussed herein are directed toward methods and apparatuses for Video Relay Systems (VRS) that automatically support and route calls for multiple spoken languages with hearing-capable users.

In many discussions herein, the terms translate, translator, and translation are used. Within the hearing-impaired support community, these functions are often referred to as interpret, interpreter, and interpretation. Therefore, as used herein, the terms translate, translator, and translation should be considered to at least encompass the terms interpret, interpreter, and interpretation, respectively.

FIG. 1 illustrates a conventional communication system 100 useful for the hearing-impaired. The communication system 100 enables a hearing-impaired user 190 (may also be referred to herein as a deaf party 390) to engage in conversation through the communication system 100 with a hearing-capable user 110. The hearing-impaired user 190 may exhibit varying levels of impairment and may be a voice-capable hearing-impaired user or a voice-incapable hearing-impaired user. A communication session between the users is facilitated through the use of various equipments, which are preferably coupled together using one or more networks (120, 170), which may include a telephone network such as the Public Switched Telephone Network (PSTN). Alternatively, use of the term "telephone network" as used herein also contemplates other networks that are compatible and configured to provide communications using digital standards and data packets, an example of which includes Voice Over Internet Protocol (VOIP).

To interface a hearing-impaired user into a generally voice-based communication system, interpretive services are employed allowing hearing-impaired users to communicate with a translator, such as, for example, through sign language. One means for relaying the communicative expressions of a hearing-impaired user 190 within the communication system 100 incorporates a video phone 192 for capturing and displaying the communicative expressions exhibited by the hearing-impaired user 190 and for displaying interpreted voice information originating from the hearing-capable user 110. The expressions, such as sign language and/or body language, may be interpreted or translated by a Video Relay Service (VRS) 150. The hearing-capable user 110 interacts in a conventional manner with the VRS 150 through a voice-based dialogue conveyed over a conventional voice phone 112 and occurring between the hearing-impaired user 190 and an interpreter at the VRS 150.

Figure 2:
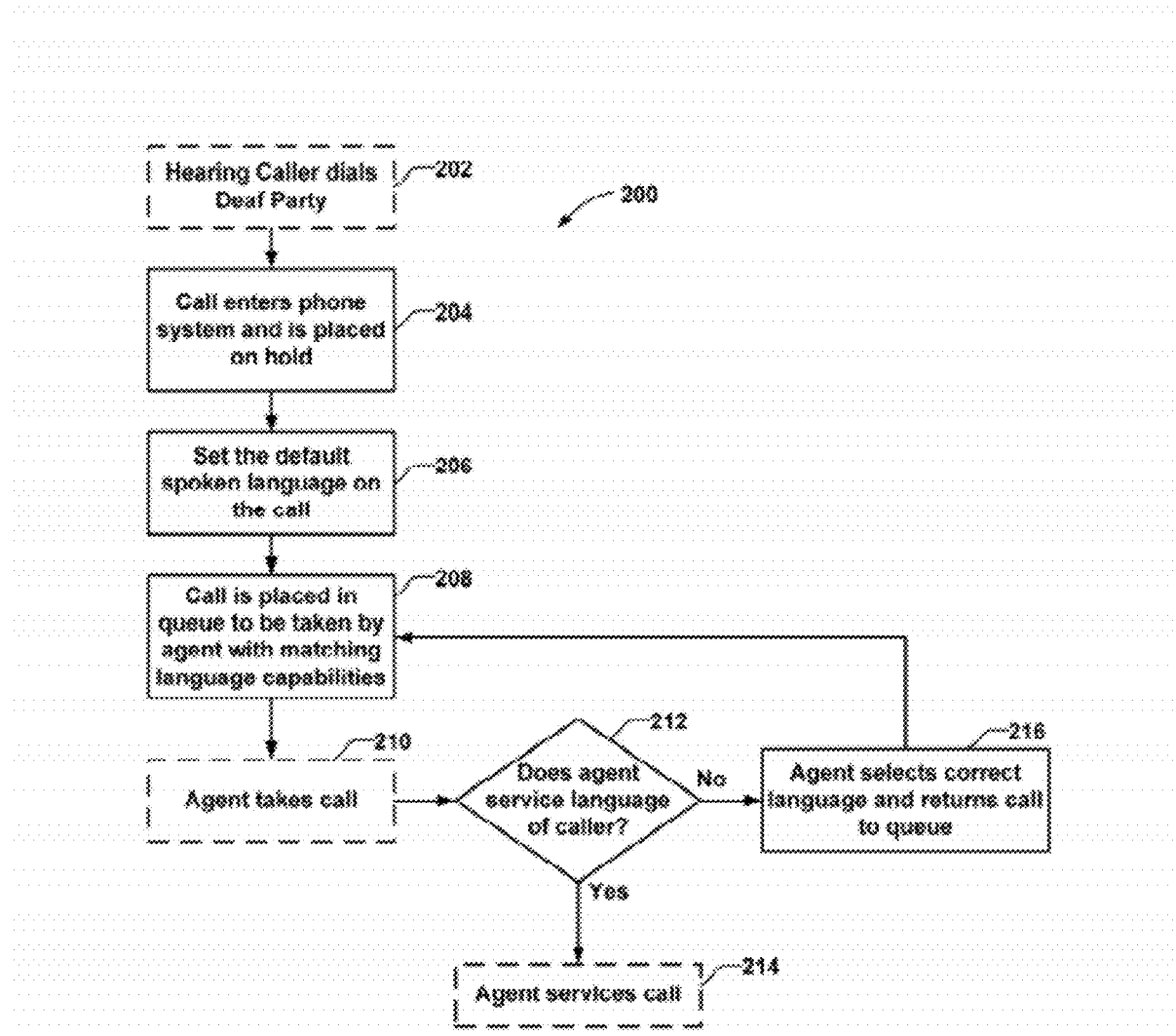
FIG. 2 is a simplified flow diagram illustrating a servicing process for a hearing-impaired communication system.

FIG. 2 is a simplified flow diagram illustrating a servicing process 200 for a hearing-impaired communication system. Acts performed by a person are indicated in the process with dashed lines whereas acts performed primarily by a computing system or processing hardware (perhaps with input from a user) are indicate with solid lines. In describing FIG. 2 reference will also be made to FIG. 1. In a conventional multi-lingual process, operation block 202 indicates that the hearing-capable user 110 dials the hearing-impaired user 190 and the call is routed through the VRS 150. In operation block 204, the call is placed in the VRS 150 and may be placed on hold pending connection to a translator.

In operation block 206 a default spoken language is defined and selected by the VRS 150. In operation block 208, the call from the hearing-capable user 110 is placed in a queue to be taken by an agent (also being referred to herein as a translator) matching certain spoken language capabilities. If entering operation block 208 from operation block 206, this spoken language would be the default spoken language.

In operation block 210 a translator capable in the selected spoken language takes the call from the hearing-capable user 110. Decision block 212 indicates a test to determine if the translator can service the selected spoken language based on input from the hearing-capable user. If so, the translator services the call, as indicated by operation block 214.

If the translator cannot service the call in the selected spoken language, operation block 216 indicates that the call language attribute is set to a new spoken language and returned to the queue. As a result, on a subsequent pass through operation block 208, the call is placed in the queue with a new spoken language. In a subsequent pass through operation block 210 a translator capable in the newly selected spoken language takes the call. Decision block 212 once again indicates a test to determine if the translator can service the newly selected spoken language. If so, the translator services the call as indicated by operation block 214. If not, another attempt is made to select a proper spoken language based on input from the hearing-capable user.

This process requires a significant amount of cumbersome and personal interaction between the translator and the VRS 150 and the hearing-capable user 110. As a result, there is a need for methods and apparatuses for Video Relay Systems (VRSs) that automatically support and route calls for multiple spoken languages with hearing-capable users.

Figure 3:
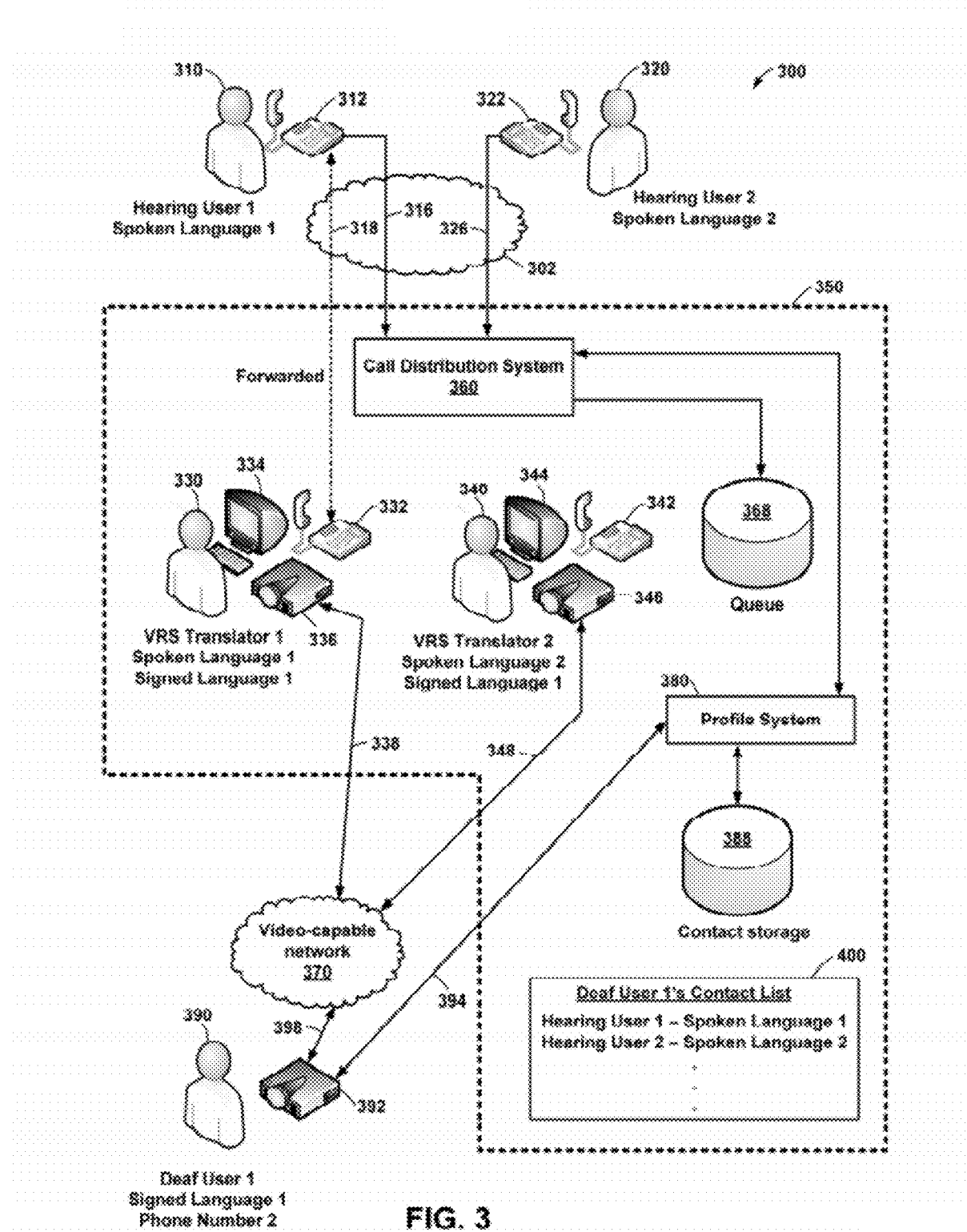
FIG. 3 illustrates a simplified block diagram illustrating a multi-lingual Video Relay Service (VRS) configured for operation with a hearing-impaired communication system in accordance with one or more embodiments of the invention.

FIG. 3 illustrates a simplified block diagram illustrating a multi-lingual Video Relay Service (VRS) configured for operation with a hearing-impaired communication system in accordance with one or more embodiments of the invention. The communication system 300 includes one or more hearing-impaired communication systems 392 (one system shown in FIG. 3 for clarity), one or more voice-capable communication systems (312 and 322) and a VRS 350 (also referred to herein as a relay service 350).

The hearing-capable user 310, 320 may use voice-capable equipment 312, 322 to communicate with the VRS 350 through voice-capable connections 316, 326 to a voice-capable network 302. The hearing-impaired user 390 may use the video-capable equipment 392 (also referred to herein as a video phone 392) to communicate with the VRS 350 through a video-capable network 370.

As used herein, voice-capable networks 302 and voice-capable equipment 312, 322 means networks and equipment that can process, convey, reproduce, or a combination thereof, sounds in the auditory frequencies as analog signals, digital signals or a combination thereof. As non-limiting examples, such equipment includes conventional telephones, conventional cellular telephones, and conventional computers or handheld devices with microphone and speaker type capabilities. As non-limiting examples, such networks include a telephone network such as the Public Switched Telephone Network (PSTN) and other networks that are compatible and configured to provide communications using digital standards and data packets, an example of which includes Voice Over Internet Protocol (VOIP).

As used herein, video-capable networks 370 and video-capable equipment 392 means networks and equipment that can process, convey, reproduce, or a combination thereof, multi-frame images. As non-limiting examples, such equipment includes conventional cellular telephones with video capability, and conventional computers or handheld devices with camera and display type capabilities. As non-limiting examples, such networks include cellular networks, WiFi networks, wide area networks, hard wired networks and other private data networks configured to provide communications using digital standards and data packets. To facilitate the enhanced bandwidth needs of video phones 392, the video-capable network 370 may be implemented as a high bandwidth network such as a DSL, Cable, Ethernet or other enhanced-bandwidth networking technology.

In general, most video-capable networks 370 would be considered to also be voice-capable networks 302 and most video-capable equipment 392 would also be considered to be voice-capable equipment 312, 322.

Within the VRS 350, a call distribution system 360 answers calls from hearing-capable users 310, 320 through calling connections 316, 326 and routes them to translators 330, 340 or places them in a queue 368. The incoming calls include a calling connection indicator such as, for example, a telephone number, an Internet Protocol (IP) address, a website address or other unique indicator that indicates how the connection is made and from where the connection is made.

The call distribution system 360 may also query a profile system 380 to determine information about the hearing-capable user 310, 320 placing the call in response to the calling connection indicator, as is explained more fully below in the descriptions of FIGS. 4 and 6. The profile system 380 may access a database 400 in contact storage 388 to obtain the information about the user placing the call, such as, for example one or more spoken languages identified with the hearing-capable user 310, 320 placing the call. The spoken language information may be returned to the call distribution system 360.

The call distribution system 360 may then assign the incoming call to a translator 330, 340 capable in the identified spoken language to handle the call. If a translator capable in the identified spoken language is not available, the incoming call may be placed on a queue 368 for subsequent acceptance by a suitable translator 330, 340. The queue 368 may include the identified spoken language correlated with the specific incoming call. Alternatively, or in addition to, there may be separate queues 368 for each spoken language handled by the VRS 350.

Each translator 330, 340 for the VRS 350 has voice-capable equipment 332, 342 for communication with the hearing-capable user 310, 320, and video-capable equipment 336, 346 for communication with the hearing-impaired user 390 in a suitable gesture language. A computer 334, 344 or other processing hardware may be used in conjunction with, or instead of, stand-alone voice-capable equipment 332, 342 and video-capable equipment 336, 346. For example, the translator 330, 340 may use the computer 334 coupled to a camera, a microphone, and speakers or headphones for all the communications.

When the translator 330, 340 is free, a new incoming call from the queue 368 is forwarded 318 to the translator 330, 340 by matching the spoken languages capabilities of the translator with the spoken languages identified for the incoming calls in the queue 368.

The translator 330, 340 connects to the hearing-impaired user 390 (may also be referred to herein as a deaf user 390) with a video-capable connection 338, 348 through the video-capable network 370, a video-capable connection 398 at the deaf user's side, and video-capable equipment 392 at the deaf user's side. Additional details of how this automated connection process for serving multiple spoken languages are provided below in the discussion of FIG. 6.

The database 400 maintained at the VRS 350 may be created, modified and updated by the hearing-impaired user 390 through a network connection 394 to the profile system 380 in the VRS 350. This network connection 394 may be any suitable network, such as, for example, the Internet, and if different from the Internet, the voice-capable network 302 or the video-capable network 370. The network connection 394 may also include tools such as web pages for viewing, updating and managing a phone book (i.e., database 400) by and for the hearing-impaired user 390.

Figures 4, 5:
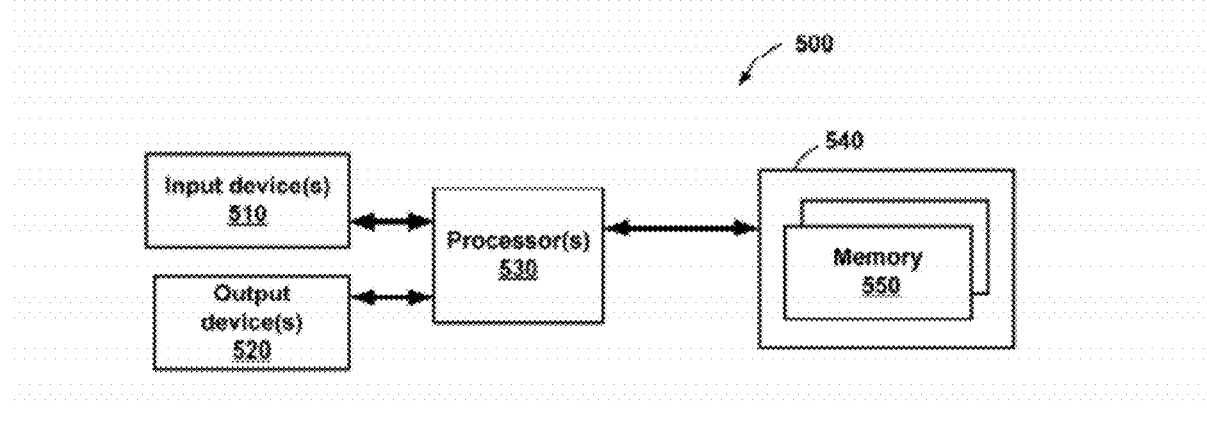
FIG. 4 illustrates is a block diagram illustrating entries in a database in accordance with one or more embodiments of the invention.
FIG. 5 is a block diagram of processing hardware that may be used in accordance with one or more embodiments of the invention.

FIG. 4 is a block diagram illustrating entries in a database 400 in accordance with one or more embodiments of the invention. The database 400 may be thought of as a contact list or phone book for the hearing-impaired user 390 that identifies preferred spoken languages for the listed contacts.

As explained below, the video phone 392 may include a keypad, keyboard, or mouse, or other data entry device configured to enable the hearing-impaired user 390 to initiate a communication session in a conventional manner by entering the telephone number of a hearing-capable user 310, 320. In addition, the hearing-impaired user 390 may be able to interact with database 400 using data entry devices to make changes to the database 400 through the network connection 394.

The database includes entries 410 for contacts 420 of the hearing-impaired User 390. Each entry 410 may include a name for the contact 420, one or more connection indicators 430 for the contact 420, and one or more spoken languages 440 in which the contact 420 is capable. Of course, other fields 450 useful in a phone-book-type database 400 may also be included. When a contact 420 makes a call that is received by the VRS 350, a calling connection indicator indicates the source of the call from the contact 420 (e.g., the cell phone number for Mom). The profile system may be used to correlate the calling connection indicator to an identified entry 410 (indicated by the dashed line to the entry for Mom) based on the connection indicators 430 associated with the identified entry 410.

Referring to FIGS. 3 and 4, as non-limiting examples, the connection indicators 430 may include web-site addresses associated with the contact 420, Internet Protocol (IP) addresses associated with the contact 420, wireless phone numbers associated with the contact 420 and wire-line phone number associated with the contact 420. A connection indicator 430 uniquely identifies a contact 420 within the database as well as a means of voice-capable connection 316, 326 (FIG. 3) to the VRS 350, the hearing-impaired user 390, and combinations thereof. The spoken language 440 may include one or more languages in which the contact can communicate with a translator 330, 340 of the VRS 350.

FIG. 5 is a block diagram of processing hardware that may be used in accordance with one or more embodiments of the invention. As shown in FIG. 5, an electronic system 500 includes at least one input device 510, at least one output device 520, a memory access device, such as one or more processors 530, and one or more memory devices 540. The memory devices 540 may include at least one semiconductor memory device 550.

As non-limiting examples, the memory devices also may include at least one computer-readable medium for storing information, processing instructions, or combinations thereof used in embodiments discussed herein. By way of example, and not limitation, the computer-readable media may include, but are not limited to, magnetic and optical storage devices such as disk drives, magnetic tapes, CDs (compact discs), DVDs (digital versatile discs or digital video discs), and other equivalent storage devices.

As non-limiting examples, input devices 510 may include keyboards, mice, touch-pads, microphones, and communication devices. As non-limiting examples, output devices 520 may include displays, speakers, and communication devices.

The electronic system 500 may be part of a number of computing, processing, and consumer products used in embodiments discussed herein. As non-limiting examples, some of these products may include personal computers, handheld devices, cameras, phones, wireless devices, and displays.

As further non-limiting examples, the voice-capable equipment 312, 322 and video-capable equipment 392 may be configured as the electronic system 500. In addition, computer servers, data servers, or combinations thereof may be configured as the electronic system 500 to implement the call distribution system, profile system 380, queue 368, and database 400 shown in FIG. 3 and a process 600 shown in FIG. 6.

Figure 6:
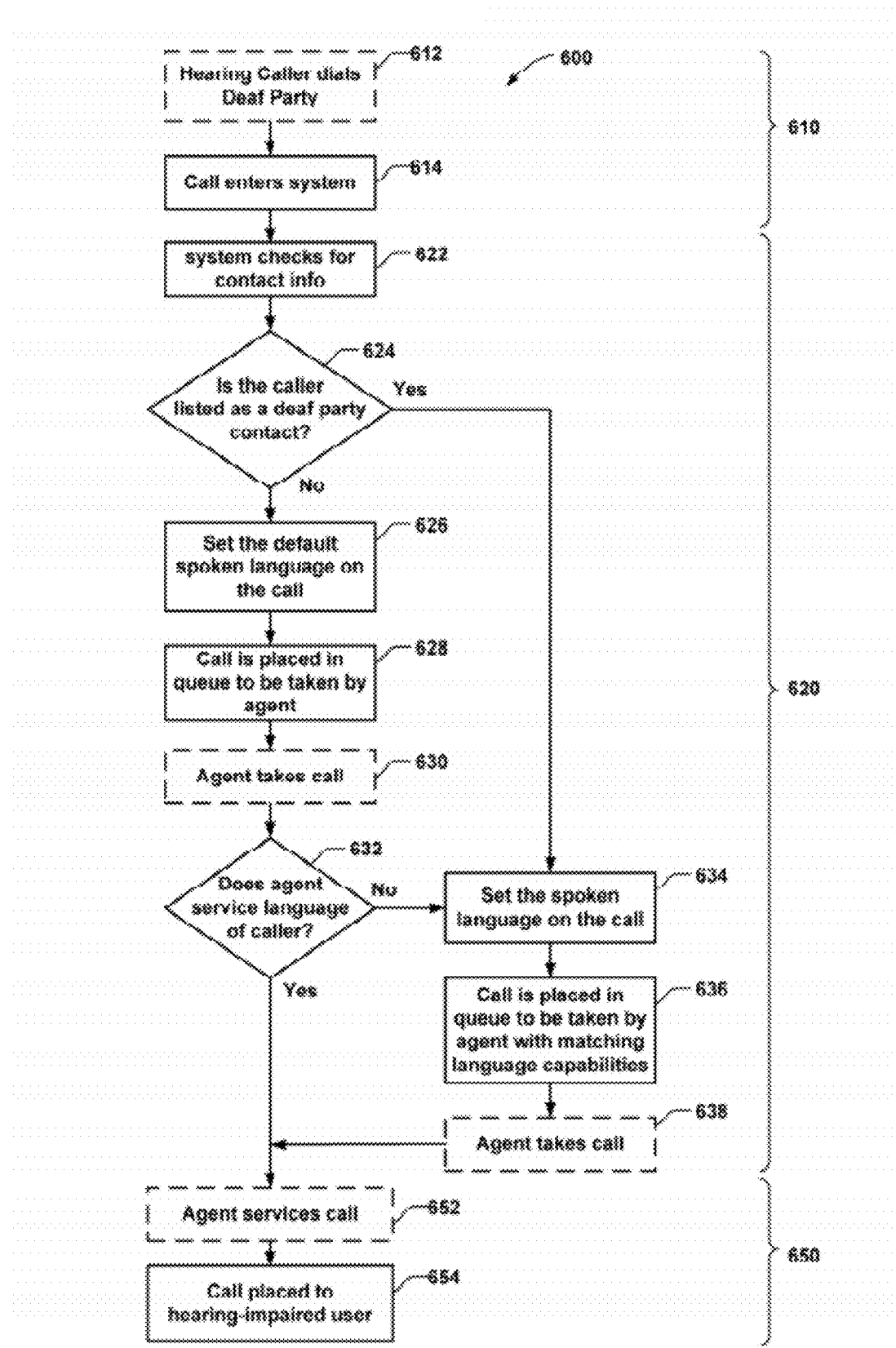
FIG. 6 is a simplified flow diagram illustrating a servicing process for a multi-lingual VRS in accordance with one or more embodiments of the invention.

FIG. 6 is a simplified flow diagram illustrating a servicing process 600 for a multi-lingual VRS in accordance with one or more embodiments of the invention. In describing the processes of FIG. 6 reference may also be made to FIGS. 3 and 4. Blocks illustrated with dashed lines illustrate operations that may be performed by a person such as the translator 330, 340, the hearing-capable user 310, 320, or the hearing-impaired user 390.

A call-receiving process 610 may include actions for receiving a call from the hearing-capable user 310, 320. Operation block 612 indicates that a hearing-capable user 310, 320 places a call to the hearing-impaired user 390. This call will have a calling connection indicator associated with it indicating from where the call was placed (e.g., an IP address). Operation block 614 indicates that the call is received by the VRS 350 and enters the call distribution system 360.

A routing process 620 may include automated actions and translator actions for routing a call to a translator 330, 340 capable in a spoken language of the hearing-capable user 310, 320. Operation block 622 indicates that the system checks for contact information. In other words, the call distribution system 360 may inquire the profile system 380 to see if there is a contact 420 in the database 400 with a connection indicator 430 that matches the calling connection indicator of the person making the call. Decision block 624 indicates this test to see if the calling party is listed as a contact for the deaf party 390.

If the caller is listed as a contact 420 in the database 400, operation block 634 indicates that the VRS 350 automatically places the call in the queue 368 to be taken by a translator 330, 340 capable in a spoken language indicated in the database 400 for the contact 420 making the call. In some embodiments, if a translator 330, 340 with the appropriate spoken language capability is available, the call may be routed directly to the translator 330, 340, bypassing operation block 636. Operation block 638 indicates that the translator 330, 340 (i.e., agent) takes the call.

A call-placing process 650 may include actions for making the video-capable connection 394 with the hearing-impaired user 390. Operation block 652 indicates that the agent services the call from the hearing-capable user 310, 320. Operation block 654 indicates that a call is placed to the hearing-impaired user 390 to create a video-capable connection 338, 348, 398 and complete the connections for the three-way communication between the hearing-capable user 310, the translator 330, 340 and the hearing-impaired user 390.

Returning to decision block 624, if the caller is not listed as a contact 420 in the database 400, operation block 626 indicates that the VRS 350 sets the call to the default spoken language for the VRS 350 and the call is placed in the queue 368 to be taken by the next available translator 330, 340. In some embodiments, if a translator 330, 340 with the default spoken language capability is available, the call may be routed directly to the translator 330, 340, bypassing operation block 628. Operation block 630 indicates that the translator 330, 340 (i.e., agent) takes the call. Decision block 632 indicates a test to see if the translator 330, 340 currently servicing the call is capable in a spoken language 440 of the caller. If not, operation block 634 indicates that the spoken language of the caller is set, such as, for example, through queries from the translator, automated queries by the VRS 350, or a combination thereof. With the spoken language of the caller identified at operation block 634, the process 600 continues as discussed above for operation blocks 636, 638, 652, and 654.

Returning to decision block 632, if the translator 330, 340 is capable in a spoken language of the caller, operation block 652 indicates that the agent services the call from the hearing-capable user 310, 320. Operation block 654 indicates that a call is placed to the hearing-impaired user 390 to create a video-capable connection 338, 348, 398 and complete the connections for the three-way communication between the hearing-capable user 310, the translator 330, 340 and the hearing-impaired user 390.

Returning to FIG. 3, if the hearing-impaired user 390 is voice-incapable, then communication with the translator 330, 340 occurs primarily through the use of gestures such as a suitable sign language. If the hearing-impaired user 390 is voice-capable, then communication with the translator 330, 340 may be performed by the hearing-impaired user 390 expressing themselves through voice signals and receiving communication from the translator 330, 340 through the use of sign language or text-based interfaces.

For voice-incapable hearing-impaired users 390, the sign language images are translated or interpreted by the translator 330, 340 providing a level of relay service defined as the "video relay service." When the sign language images are translated by translator 330, 340 of the relay service 350 they are forwarded as voice information over the voice-capable connection 316, 326 to the hearing-capable user 310, 320. The hearing-capable user 310, 320 interacts in a conventional manner with the translator 330, 340 through the use of voice-based dialog conveyed over the voice-capable connection 316, 326.

For voice-capable hearing-impaired users 390, extensions of relay services have included the development of voice bridges known as Voice Carry-Over (VCO), which enable the voice-capable hearing-impaired user 390 to speak directly to the hearing party. In such an application, the VRS 350 may form the voice bridge or conferencing of the voice-capable hearing-impaired user's voice. In such a service configuration, once the conference call is established, the translator 330, 340 is employed only for the conversion of the voice portion of the call from the hearing-capable user 310, 320 that is to be delivered to the hearing-impaired user 390. It should be apparent that not all hearing-impaired individuals have adequate or intelligible speech capabilities for utilization of a relay service configured to provide VCO services. However, such an arrangement does provide a more efficient and personal method of communication between a voice-capable hearing-impaired user and another individual.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims and their legal equivalents.

What is claimed is:

1. A relay service for providing translation services between a hearing-impaired user and a hearing-capable user, comprising:
 a database with one or more entries, each of the one or more entries associated with a hearing-capable contact of the hearing-impaired user and including one or more connection indicators for the contact and one or more spoken languages understood by the contact;
 a profile system configured to determine an identified entry in the database using a calling connection indicator associated with the hearing-capable user to compare with the one or more connection indicators for the contact; and
 a call distribution system configured to:
  establish a calling connection over a voice-capable network with the calling connection indicator associated with the hearing-capable user;
  route the calling connection to a translator capable in a gesture language and the one or more spoken languages associated with the hearing-capable user determined from the identified entry; and
  establish a video-capable connection between the translator and the hearing-impaired user over a video-capable network.

2. The relay service of claim 1, wherein the call distribution system is further configured to:
 add the identified entry to a queue associated with one or more translators capable in the one or more spoken languages associated with the hearing-capable user; and
 select from the queue the identified entry to route to the translator.

3. The relay service of claim 1, wherein the video-capable connection is to an internet protocol address associated with the hearing-impaired user.

4. The relay service of claim 1, wherein the video-capable connection further comprises audio capability and the relay service further comprises a connection system for establishing an audio connection between the hearing-impaired user and the hearing-capable user.

5. The relay service of claim 1, wherein the voice-capable network and the video-capable network are the same network.

6. The relay service of claim 1, wherein the one or more connection indicators for the contact comprise a phone number associated with the hearing-capable user.

7. The relay service of claim 1, wherein the one or more connection indicators for the contact comprise an internet protocol address associated with the hearing-capable user.

8. An apparatus for enabling a relay service between a hearing-capable user and a hearing-impaired user, the apparatus comprising:
 a database configured to store therein one or more entries, each of the one or more entries associated with a contact of the hearing-impaired user and including one or more connection indicators for the contact and one or more spoken languages for the contact; and
 processing hardware configured to perform:
  a call-receiving process to establish a calling connection with the hearing-capable user over a voice-capable network using a calling connection indicator;
  a routing process to determine an identified entry of the one or more entries correlated to the calling connection indicator and route the calling connection to a translator capable in a gesture language and the one or more spoken languages; and
  a call-placing process to establish a video-capable connection between the hearing-impaired user and the translator over a video-capable network.

9. The apparatus of claim 8, wherein the processing hardware is further configured to perform the routing process to:
 add the identified entry to a queue associated with one or more translators capable in the one or more spoken languages; and
 select from the queue the identified entry to route to the translator.

10. A method for enabling electronic communication between a hearing-capable user and a hearing-impaired user, comprising:
 selecting an identified entry from a database comprising one or more entries, wherein each of the one or more entries is associated with a contact of the hearing-impaired user and includes one or more connection indicators for the contact and one or more spoken languages for the contact, and the identified entry is selected responsive to the one or more connection indicators for the hearing-capable user;
 routing a calling connection from the hearing-capable user to a translator capable in a gesture language and the one or more spoken languages of the hearing-capable user; and
 establishing a video-capable connection between the translator and the hearing-impaired user over a video-capable network.

11. The method of claim 10, further comprising:
 adding the identified entry to a queue associated with one or more translators capable in the one or more spoken languages; and
 selecting the identified entry from the queue as part of performing the act of routing the calling connection.

12. The method of claim 10, further comprising establishing a voice-capable connection between the translator and the hearing-capable user over a voice-capable network using the one or more connection indicators for the contact for the hearing-capable user.

13. The method of claim 10, wherein establishing the video-capable connection comprises establishing an Internet connection.

14. The method of claim 10, wherein establishing the voice-capable connection is selected from the group consisting of establishing an Internet connection and establishing a connection to a public switched telephone network.

15. The method of claim 10, further comprising establishing an audio connection between the hearing-impaired user and the hearing-capable user.

16. Computer-readable media including instructions configured to cause processing hardware to:
 select an identified entry from a database comprising one or more entries, wherein each of the one or more entries is associated with a contact of a hearing-impaired user and includes one or more connection indicators for the contact and one or more spoken languages for the contact and the identified entry is selected responsive to the one or more connection indicators for a hearing-capable user;

route a calling connection from the hearing-capable user to a translator capable in a gesture language and the one or more spoken languages of the hearing-capable user; and establish a video-capable connection between the translator and the hearing-impaired user over a video-capable network.

17. The computer-readable media of claim 16, further comprising instructions configured to cause the processing hardware to:

add the identified entry to a queue associated with one or more translators capable in the one or more spoken languages; and select the identified entry from the queue as part of performing the act of routing the calling connection.

18. The computer-readable media of claim 16, further comprising instructions configured to cause the processing hardware to establish a voice-capable connection between the translator and the hearing-capable user over a voice-capable network using the one or more connection indicators for the hearing-capable user.

19. The computer-readable media of claim 16, wherein establishing the video-capable connection comprises establishing an Internet connection.

20. The computer-readable media of claim 16, wherein establishing the voice-capable connection is selected from the group consisting of establishing an Internet connection and establishing a connection to a public switched telephone network.

21. The computer-readable media of claim 16, further comprising instructions configured to cause the processing hardware to establish an audio connection between the hearing-impaired user and the hearing-capable user.

* * * * *